June 3, 1969      F. KRUMBEIN      3,447,868

MOTION PICTURE PROJECTOR

Filed Sept. 14, 1966

United States Patent Office 3,447,868
Patented June 3, 1969

3,447,868
MOTION PICTURE PROJECTOR
Fritz Krumbein, Stuttgart-Mohringen, Germany, assignor to Zeiss Ikon Aktiengesellschaft, Stuttgart, Germany, a corporation of Germany
Filed Sept. 14, 1966, Ser. No. 579,287
Claims priority, application Germany, Oct. 8, 1965, Z 11,799
Int. Cl. B65h 17/40; G03b 1/22
U.S. Cl. 352—173                                    8 Claims

ABSTRACT OF THE DISCLOSURE

A motion picture projector is provided with a reversible cam disc drive for the film strip conveying claw. A cam disc is selectively rotatable in opposite directions and its circumference is engaged by a slide member arranged on and between the ends of the film strip conveying claw. The slide member is so constructed that different portions of the same can be brought in engagement with the cam disc depending on the direction in which the cam disc is rotated, so that automatically the displacement of the film picture in the picture window of the projector is corrected when the direction of movement of the film strip is changed.

---

The invention relates to a motion picture projector provided with a cam-operated claw arrangement for the forward and rearward movement of the film strip during its projection and also provided with a device for automatically correcting the displacement of the film picture in the picture window which takes place when the direction of the movement of the film strip from a forward movement is changed to a rearward movement and vice versa.

It is an object of the present invention to compensate the change in the position of the film picture during the forward and rearward movement of the film which is caused by the film strip conveying claw by making an adjustment in the cam-operated drive mechanism which is connected with the main drive arrangement of the projector. The adjustment in the cam-operated drive for the film strip conveying claw may take place by the friction between at least one of the cam discs and the slide member which engages the cam disc and which is arranged on the film strip conveying claw.

In accordance with the invention the film strip conveying claw may be provided with a slide member which is adjustable between two end positions and is provided with a curved slide surface, whereby one of these two end positions of the slide member determines the forward movement position of the film strip conveying claw.

In accordance with a particular construction of the invention the film strip conveying claw carries a slide member which is swingable into two end position, whereby the pivot axis of this slide member is arranged parallel to the axis of rotation of the cam disc which executes the conveying stroke for the film strip. In doing this the slide member is moved by friction into its end position designating the forward movement. Any further necessary correction of the position of the picture line is initially made manually.

During the change from a forward movement to a rearward movement, the cam disc also changes its direction of rotation. The frictional engagement causes a swinging of the swingable slide member into its other end position designating the rearward movement. When this takes place, the slide surface of the slide member, owing to a change in the shape of the cam, causes a displacement of the position of the film conveying claw relative to the cam disc as is necessary in order to prevent a displacement of the film picture in the picture window of the projector.

In accordance with another embodiment of the invention the cam disc, which controls the position of the film strip conveying claw, may also be arranged in such a manner so as to be displaceable along its axis of rotation. In such a case the slide member carried by the film strip conveying claw is provided with an inclined slide surface which is similar to the inclination of the cam surface. During the reversal of the movement of the film strip in the projector, this cam disc performs a slidable movement in the direction of its axis of rotation. The inclined surfaces of the slide member on the film strip conveying claw and on the circumference of the cam disc which engage each other perform thereby the necessary change in the position of the film strip conveying claw.

With these and other objects in view the invention will now be described by way of examples in connection with two embodiments which disclose the above-mentioned features of the invention.

Figure 1:
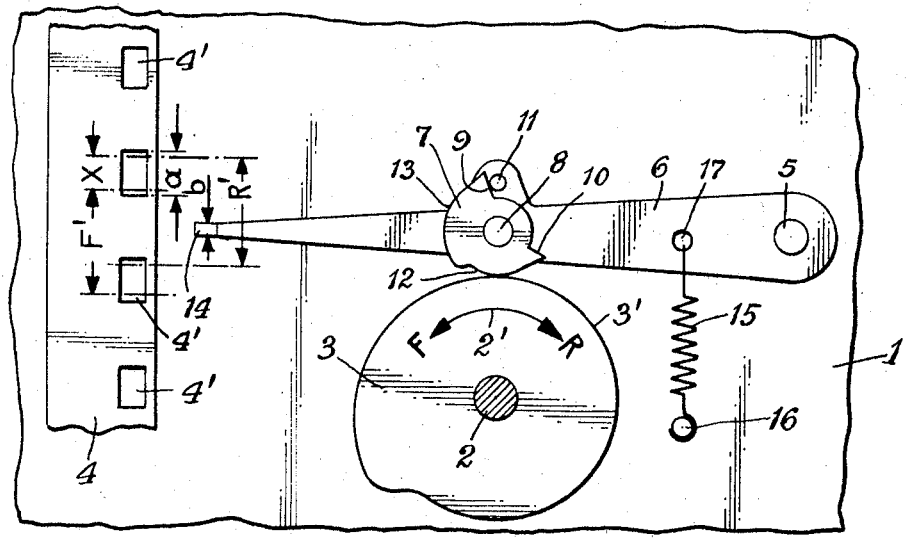
FIG. 1 illustrates diagrammatically in a side elevation view a portion of a small film projector, namely that portion where the film strip correcting device is arranged.

Referring to FIG. 1, the housing 1 of a small film motion picture projector has rotatably supported therein a main shaft 2 on which is mounted a cam disc 3 for controlling the conveying stroke of the film strip 4. A film conveying claw is swingably mounted at one of its ends on a bearing 5 which in turn is bodily eccentrically movable about an axis parallel to the shaft 2 in order that the point 14 at the other end of the claw 6 may enter into any may be withtdrawn from the perforations 4′ provided in the film strip 4. This film strip 4, for the sake of illustration, is shown as being arranged in the plane of the drawing, but in actual practice the film strip is arranged perpendicular to the plane of the drawing. The film conveying claw 6 has mounted thereon between its ends a slide member 7, the circumference of which is in engagement with the circumference 3′ of the cam disc 3. The slide member 7 is rotatably mounted on a bearing pin 8 attached to the film conveying claw 6. The slide member 7 is provided with two circumferentially spaced radial abutment faces 9 and 10 which cooperate with a single stop pin 11 attached fixedly to the claw 6. This stop pin 11 and the abutment faces 9 and 10 limit the swinging range of the slide member 7 relative to the claw 6. In each end position the slide member 7 engages with an arc-shaped portion the circumference 3′ of the cam disc 3. When the abutment face 9 engages the pin 11, then the arcuate portion 12 engages the circumference 3′ of the cam disc 3. The two arcuate portions 12 and 13 are portions of circles extending concentrically around the bearing pin 8, but they have each a different radius. The difference in the radii corresponds to the necessary correction in the position of the film conveying claw 6 in the forward and rearward conveying position, respectively. FIG. 1 illustrates in what manner the correction has to take place when the direction of rotation is reversed. F indicates on the direction arrow 2′ on the cam disc 3 the direction of rotation of the latter during the forward movement of the film strip and in the neighborhood of the film strip 4. F′ indicates the range of movement of the claw point 14 during the forward movement. R and R′ indicate on the cam disc and film strip respectively the same conditions during the rearward movement of the film strip. The difference $x$ in the position between the ranges of movement F' and R' of the point 14 of the claw 6 corresponds to the difference between the length $a$ of one aperture 4' of the film perforation and the width $b$ of the claw point 14. A spring 15 is connected with one end to a pin 16 fixedly attached to the housing, while the other end of the spring 15 is inserted in a hole 17 in the film conveying claw 6. The spatial separation between the film strip 4 and the point 14 of the claw 6 as shown in the drawing is solely illustrated for the sake of clearness. As mentioned previously, the plane of the film strip A is disposed perpendicular to the plane of the drawing.

The device for automatically maintaining the picture in the proper position in the film window operates according to the example illustrated in FIG. 1 substantially as follows: During the forward movement of the film strip in which the cam disc 3 is rotated in the direction F, the friction between the circumference of the cam disc 3 and the slide member 7 is such that the radial abutment face 9 will engage the pin 11. When this takes place, then the movement of the point 14 of the claw at the film strip 4 takes place in the range F'.

When the direction of rotation of the cam disc 3 is reversed, the latter rotates in the direction R, and then the friction between the circumference 3' of the cam disc 3 and the slide member 7 is such that the latter performs a swinging movement until the radial abutment face 10 thereon engages the pin 11. When this has taken place, the movement of the point 14 of the claw 6 at the film strip 4 is placed within the range R'; this means that the same picture position as previously is maintained and the picture line will remain outside of the picture window in the projector.

Figure 2:
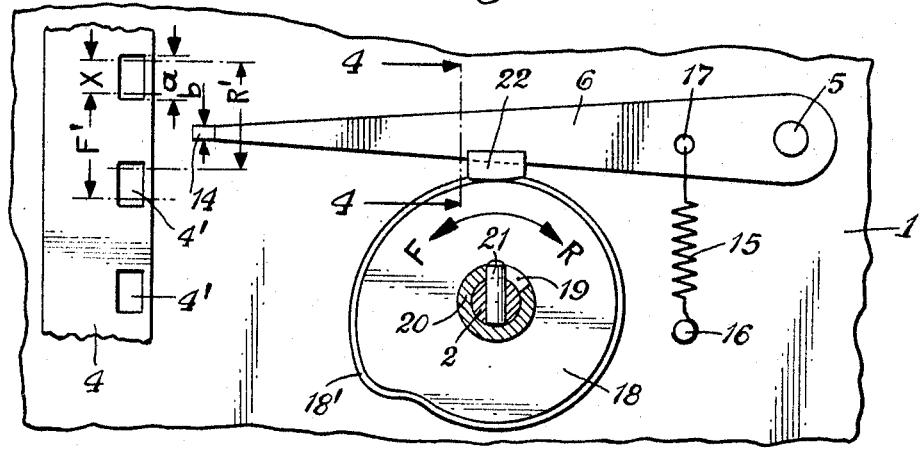
FIG. 2 illustrates diagrammatically a modified correcting device likewise as a portion of a small film projector.
Figure 3:
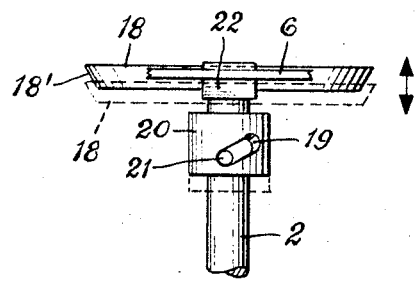
FIG. 3 illustrates in top elevation view a portion of the device shown in FIG. 2.
Figure 4:
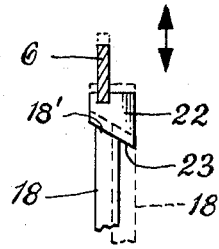
FIG. 4 is a sectional view along the line 4—4 of FIG. 2.

In the other embodiment of the invention as it is illustrated in the FIGS. 2 to 4 the rotatable cam disc 3 is replaced by a cam disc 18 whose tubular hub 20 is provided with a spiral groove 19. A radial pin 21 attached to the main shaft 2 projects into this spiral groove 19. Furthermore, the circumferential surface 18' on the cam disc 18 is arranged at an angle with respect to the longitudinal axis of the main shaft 2 (FIG. 3).

In place of the slide member 7 is used another slide member 22 which is fixedly attached to the film strip conveying claw 6 between the ends thereof. The slide member 22 is provided with an inclined slide surface 23 which engages the correspondingly inclined circumferential surface 18' on the cam disc 18.

During the forward movement of the film strip, namely when the cam disc 18 is rotated in the direction F, the friction between the circumference of the cam disc 18 and the slide member 22 causes a swinging and slidable movement of the cam disc 18 relative to the main shaft 2 until the pin 21 (see FIG. 3) engages one end of the spiral groove 19 in the tubular hub 20. In this relative position between the cam disc 18 and the main shaft 2 the point 14 of the claw 6 moves within the range F'.

During the reverse movement of the film strip, when the cam disc 18 is rotated in the direction R, the friction between the circumference 18' of the cam disc 18 and the slide member 22 is such that owing to the mass moment of inertia of the cam disc 18 there takes place first the already above-mentioned swinging and slidable movement of the cam disc 18 in the opposite direction as heretofore on the main shaft 2. When this swinging and slidable movement is completed, the pin 21 engages the other end of the spiral groove 19 in the hub 20. During this movement the circumferential surface 18' of the cam disc 18 has moved onto the slide surface 23 of the slide member 22. Simultaneously therewith the claw point 14 has been moved into the range R' at the film strip 4. The FIGS. 3 and 4 indicate in dash lines the positions of the parts 18 and 22.

Both of these described embodiments of the invention show in what simple manner the desired result may be obtained. This result may not only be obtained by a direct manual operation of the motion picture projector but one may also employ for this purpose a remote operation.

What I claim is:

1. In a motion picture projector provided with a reversible cam disc drive for the film strip conveying claw to move the film selectively in a forward and rearward direction, means for automatically compensating the displacement of the film picture in the picture window of the projector when the direction of movement of the film strip is reversed, said means effecting an adjustment of said cam disc drive during the reversion of its direction of rotation, said cam disc drive including a cam disc, means for rotating the same selectively in one direction and in a reverse direction, a slide member on said film strip conveying claw in frictional engagement with the circumference of said cam disc, and means for causing different portions of said slide member and cam disc to engage one another when the direction of rotation of said cam disc is reversed.

2. A motion picture projector according to claim 1, in which said slide member comprises a member provided with a curved slide surface which is in engagement with said cam disc, and means for movably attaching said slide member to said film strip conveying claw and for stopping its movement in two end positions, one of said end positions of said slide member determining the forward run of the film strip and the other end position of said slide member determining the rearward run of said film strip.

3. A motion picture projector according to claim 1, in which said slide member comprises a member provided with a curved slide surface which is in engagement with said cam disc, means for rotatably attaching said slide member to said film strip conveying claw and for limiting its rotative movement in both directions, at the end of one of said directions the position of the slide member determining the forward run of said film strip and at the end of the other one of said directions the position of the slide member determining the rearward run of said film strip.

4. A motion picture projector according to claim 1, in which said slide member comprises a member provided with a curved slide surface which is in engagement with said cam disc, means for rotatably attaching said slide member to said film strip conveying claw and for limiting its rotative movement in both directions, at the end of one of said directions the position of the slide member determining the forward run of said film strip and at the end of the other one of said directions the position of the slide member determining the rearward run of said film strip, said slide member being rotatable about an axis which extends parallel to the axis of rotation of said cam disc.

5. A motion picture projector according to claim 1, in which said slide member comprises a member provided with a curved slide surface which is in engagement with said cam disc, means for rotatably attaching said slide member to aid film strip conveying claw and for limiting its rotative movement in both directions, at the end of one of said directions the position of the slide member determining the forward run of said film strip and at the end of the other one of said directions the position of the slide member determining the rearward run of said film strip, said slide member being provided with two consecutive arcuate slide surfaces extending concentrically about the axis of rotation of said slide member but having each a different radius.

6. A motion picture projector according to claim 1, in which said cam disc has a circumferential cam surface inclined with respect to its axis of rotation, said slide member having a correspondingly inclined slide surface frictionally engaging said circumferential cam surface of said cam disc, whereby different portions of said slide member and cam disc engage one another when the direction of rotation of said cam disc is reversed.

7. A motion picture projector according to claim 1, in which said cam disc has a circumferential cam surface inclined with respect to its axis of rotation, said slide member having a correspondingly inclined slide surface fricitonally engaging said circumferential cam surface of said cam disc, whereby different portions of said slide member and cam disc engage one another when the direction of rotation of said cam disc is reversed, said means for causing an axial movement of said cam disc including a radial pin on a shaft on which said cam disc is mounted and a spiral slot in a hub on which said cam disc is fixedly secured.

8. A motion picture projector according to claim 1, in which said slide member comprises a member provided with a curved slide surface which is in engagement with said cam disc, and means for movably attaching said slide member to said film strip conveying claw and for stopping its movement in two end positions, one of said end positions of said slide member determining the forward run of the film strip and the other end position of said slide member determining the rearward run of said film strip, said means for stopping the movement of said slide member in both said end positions comprises abutment means.

References Cited
UNITED STATES PATENTS 2,974,840  3/1961  Kuhnert _____ 352—173 X NORTON ANSHER, *Primary Examiner.*

MONROE H. HAYES, *Assistant Examiner.*

U.S. Cl. X.R.
226—49; 352—162